Figure 1:
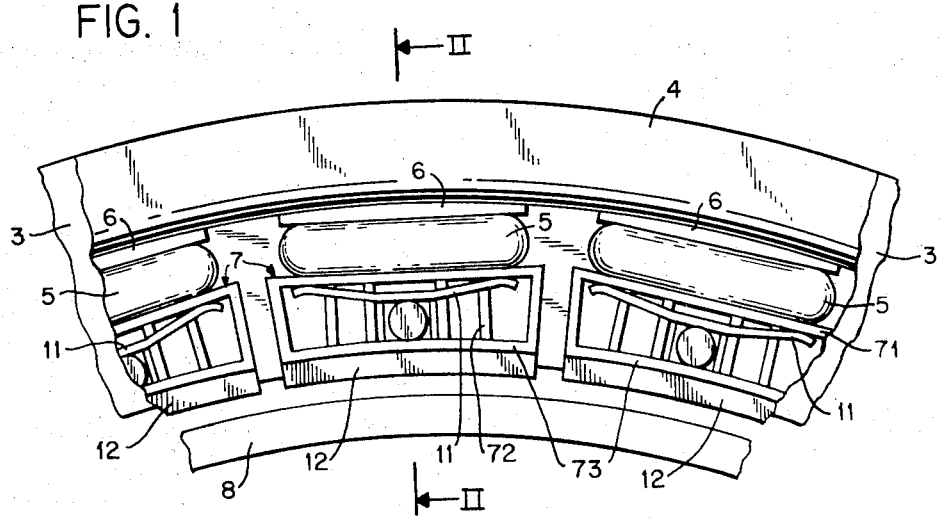

United States Patent
Sugahara

[11] 3,777,868
[45] Dec. 11, 1973

[54] FLUID OPERATED COUPLING DEVICE

[75] Inventor: Eisuke Sugahara, Tokyo, Japan

[73] Assignee: Nippon Piston Ring Kabushiki Kaisha, Tokyo, Japan

[22] Filed: July 3, 1972

[21] Appl. No.: 268,518

[30] Foreign Application Priority Data
July 10, 1971  Japan.............................. 46/60782

[52] U.S. Cl. ............................ 192/88 B, 188/367
[51] Int. Cl. ......................................... F16d 25/04
[58] Field of Search ................. 188/367; 192/88 B, 192/85 AT

[56] References Cited
UNITED STATES PATENTS
2,955,684  10/1960  Hasselhorn.................... 192/88 B X
3,173,526  3/1965  Eakin........................... 192/88 B X FOREIGN PATENTS OR APPLICATIONS
892,261  10/1953  Germany....................... 192/85 AT Primary Examiner—Benjamin W. Wyche
Attorney—Kurt Kelman et al.

[57] ABSTRACT

An inner cylindrical face of a coupling member carries two axially juxtaposed circumferential rows of expansion chambers, and a friction shoe is attached to each pair of respective expansion chambers of the two rows. When the expansion chambers are inflated by compressed air, the friction shoes are engaged with an outer cylindrical face of a second coupling member. The device may operate as a clutch or as a brake.

6 Claims, 2 Drawing Figures

PATENTED DEC 11 1973　　　　　　　　　　　　　　　　　3,777,868

FLUID OPERATED COUPLING DEVICE

This invention relates to pressure-fluid operated coupling devices such as clutches or brakes, and is particularly concerned with improvements in the apparatus disclosed in Gantt U.S. Pat. No. 3,225,877 or in my earlier Pat. No. 3,618,726.

It is a common feature of both patents that friction shoes on one coupling member are engaged with another coupling member by means of an annular chamber of elastomeric material backing the shoes when the chamber is expanded by means of a pressure fluid, such as compressed air. While available elastomeric materials permit the expansion chambers of the known devices to operate satisfactorily over extended periods, the chambers eventually need to be repaired or replaced when they develop leaks. As a rule, the entire device must be disassembled for this purpose at substantial cost and loss in time.

It has been attempted to replace a single annular expansion chamber by a row of circumferentially offset smaller cells, but the torque capable of being transmitted by a coupling device having a plurality of cells is only 50 percent to 60 percent of the torque that may be transmitted by a coupling device of the same overall dimensions provided with a single, annular expansion chamber. When the multiple-cell coupling is enlarged radially to provide the same torque transmitting force, the centrifugal forces generated during normal operation are substantially increased and cause design problems of their own which increase the cost of the device.

It is the primary object of this invention to avoid the shortcomings of a coupling device having a single, annular expansion device without loss of torque transmitting capacity and without increase in radial dimensions.

With these and other objects in view, as will hereinafter become apparent, the invention provides one of the two radially opposite circumferential faces of respective coupling members with two axially offset rows of circumferentially spaced expansion chambers. A friction shoe is secured to each chamber which may be supplied with fluid under pressure for thereby frictionally engaging the associated shoe with the other face. Yieldably resilient means bias the shoe away from the other face, as is known in itself.

According to a preferred feature of the invention, the expansion chambers each include two plate members connected by an annular bellows member of U-shaped cross section whose edges are respectively attached to outer rims of the two plate members.

Figure 2:
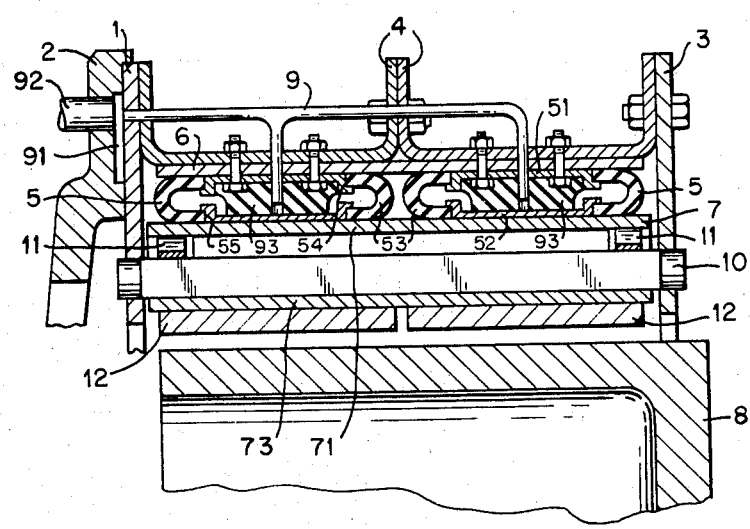

Other features, additional objects, and many of the attendant advantages of this invention will readily be appreciated as the same becomes better understood by reference to the following detailed description of a preferred embodiment when considered in connection with the appended drawing in which:

FIG. 1 shows a fluid-operated clutch of the invention in a fragmentary view taken in the direction of the axis of rotation; and FIG. 2 illustrates the same device in fragmentary section on the line II—II in FIG. 1.

The drawing shows as much of a pneumatically operated clutch of the general type disclosed in U.S. Pat. No. 3,225,877 as is necessary for an understanding of the invention. The output member of the clutch is a wheel having a first flat annular disc 1 which is located in a radial plane and is fixedly attached to a spider 2, the disc 1 and spider 2 having been omitted from FIG. 1 to reveal internal structure. A second annular disc 3 substantially identical with the disc 1 is fixedly fastened to the latter in axially spaced relationship by two axially juxtaposed, identical channels 4 which each extend in a closed loop about the clutch axis. The webs of the channels 4 are located in a common cylindrical surface about the clutch axis, and the flanges project radially outward from the webs. Respective axially contiguous flanges of the channels 4 are bolted to each other, and the remote flanges are bolted to the discs 1, 3 respectively.

Axially elongated seating plates 6 are equiangularly distributed about the clutch axis. Each seating plate 6 is bolted to the inner cylindrical faces of both channels 4 so as further to enhance the rigidity of the output member. The faces of the plates 6 directed toward the channels 4 are cylindrically curved for conforming engagement with the channels 4, and the faces directed in a radially inward direction are flat. The bolts which fasten the channels 4 to a seating plate also attach two expansion chambers 5 to each seating plate 6, the arrangement being such that two circumferential rows of spaced expansion chambers are axially juxtaposed on the inner faces of the channels 4, each expansion chamber of one row being axially aligned with the expansion chamber of the other row.

Each expansion chamber consists of two, approximately dish-shaped, substantially identical plates 51, 52. The plate 51 is bolted to the seating plate 6 and connected to the plate 52 by an annular bellows member 53 of U-shaped cross section. One inner edge of the member 53 is clamped between the raised, circular edge 54 of the plate 51 and the seating plate 6, and the other inner edge of the member 53 is similarly clamped between the edge 55 of the plate 52 and the radially outer wall 71 of a carrier 7 which is fixedly fastened to the two plates 52 of the two associated expansion chambers 5.

The carriers 7 are similar to corresponding elements disclosed in more detail in my afore-mentioned, earlier patent. A bearing bar 10 whose ends are journaled in the discs 1, 3 respectively passes axially through each carrier between spaced partitions 72 which connect the outer wall 71 of the carrier 7 to the radially inner wall 73. An arcuate leaf spring 11 is interposed in compression between the bar 10 and the outer wall 71 of each carrier 7. It tends to shift the carrier 7 radially outward and to compress the associated expansion chambers 5. Each radially inner wall 73 carries two axially spaced friction facings 12 so that each carrier 7 and the associated facings 12 jointly constitute a friction shoe.

In the illustrated position of the apparatus, the friction facings 12 spacedly surround the outer cylindrical portion 8 of a wheel which is the input member of the clutch. A manifold pipe 9 extends from an annular distributor duct 91 between the disc 1 and the spider 2 into each pair of expansion chambers 5, and the duct 91 is connected with a non-illustrated control valve of a compressed air system by a conduit 92 only partly seen in FIG. 2. A rubber buffer 93 in each chamber 5 prevents the pipe 9 from hitting the plate 52.

When the non-illustrated valve is opened, the compressed air uniformly expands the chambers 5 and thereby engages the friction facings 12 with the driving face of the wheel 8 to transmit torque to the spider 2 and to devices connected thereto and not in themselves relevant to this invention. When the chambers 5 are vented to the atmosphere by the non-illustrated control valve, the springs 11 cause rapid deflation of the chambers 5, and the illustrated clutch does not go through a significant period of slipping engagement.

As is evident from FIG. 1, pairs of expansion chambers 5 together with the associated seating plates 6 and friction shoes 7, 12 are readily accessible by removing the disc 3, and may be released from the driving wheel by a simple unbolting operation for repair or replacement. The two rows of expansion chambers 5 can transmit approximately as much torque by means of the bearing bars 10 as a single annular expansion chamber of equal or even greater radial thickness, though of somewhat smaller axial width so that the centrifugal forces generated during operation of the clutch are not of a magnitude to require basic changes in the clutch construction. The two rows of friction facings 12 have been found to suffer less wear under comparable operating conditions than a single facing having an axial width equal to the combined width of the pair of facings 12 on each carrier 7.

The honeycomb structure of the carriers prevents the thermal energy generated by friction during clutch engagement and disengagement from reaching the elastomeric material of the expansion chambers 5 as is known in itself.

The bellows member 53, in the relaxed condition, has the approximate shape of a hollow tore whose central part was cut away along a coaxial cylindrical surface. It has been found to have a longer useful life than a tubular member of elastomeric material of the same thickness, yet it can be made of heavier stock without impairing the quick response of the expansion chamber 5 to internal fluid pressure or to the collapsing pressure of the associated spring 11. Oil-resistant synthetic rubbers of the polychloroprene or Buna-S type have been found particularly useful.

The invention has been described hereinabove with specific reference to a pneumatically operated clutch transmitting torque from the wheel 8 to the spider 2. It will be appreciated that the clutch may be used for transmitting torque in the opposite direction, and that it functions as a brake if the spider 2 or the wheel 8 is locked in its angular position. In use as a clutch or brake, the opposite circumferential faces of the wheel 8 and the spider 2 are cylindrical about a common axis. However, the device can be used to couple respective, non-illustrated shafts attached to the spider 2 and the wheel 8 when the shafts are not precisely coaxial. Other applications of the invention for frictionally coupling two parts of an apparatus will readily suggest themselves to those skilled in the art.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A coupling device comprising, in combination:
  a. a first coupling member mounted for rotation about an axis;
  b. a second coupling member, said members having respective radially opposite circumferential faces of substantially circular cross section;
  c. two axially offset rows of circumferentially spaced expansion chambers mounted on one of said faces;
  d. a plurality of seating members interposed between said expansion chambers and said one face, said seating members being spaced circumferentially from each other, and each seating member carrying two expansion chambers of said two rows respectively;
  e. a friction shoe secured to each of said chambers;
  f. supply means for supplying a fluid under pressure to each of said chambers and for thereby frictionally engaging said shoe with the other face; and
  g. yieldably resilient means biasing said friction shoes away from said other face.

2. A device as set forth in claim 1, wherein each expansion chamber includes two rigid plate members respectively fixedly fastened to said one face and to the associated friction shoe, and a bellows member connecting said plate members.

3. A device as set forth in claim 2, said bellows member is annular and of U-shaped cross section, respective edge portions of said bellows member being fixedly fastened to respective peripheral rim portions of said plate members, said bellows member biasing said plate members toward respective spacedly parallel positions.

4. A coupling device comprising, in combination:
  a. a first coupling member mounted for rotation about an axis;
  b. a second coupling member, said members having respective radially opposite circumferential faces of substantially circular cross section;
  c. two axially offset rows of circumferentially spaced expansion chambers mounted on one of said faces;
  d. a friction shoe secured to each of said chambers;
  e. supply means for supplying a fluid under pressure to each of said chambers and for thereby frictionally engaging said shoe with the other face; and
  f. yieldably resilient means biasing said friction shoes away from said other face,
    1. each expansion chamber including two rigid plate members respectively fixedly fastened to said one face and to the associated friction shoe, and a bellows member connecting said plate members,
    2. said bellows member being annular and of U-shaped cross section, respective edge portions of said bellows member being fixedly fastened to respective peripheral rim portions of said plate member, said bellows member biasing said plate members toward respective sapcedly parallel positions.

5. A device as set forth in claim 4, wherein each friction shoe is fixedly fastened to respective plate members of two expansion chambers of said rows respectively.

6. A device as set forth in claim 5, wherein each friction shoe includes a carrier member and two friction facings spacedly juxtaposed in an axial direction.

* * * * *